(12) United States Patent
Martin

(10) Patent No.: US 10,737,182 B2
(45) Date of Patent: Aug. 11, 2020

(54) SYSTEM AND METHOD FOR MANAGING FANTASY SPORTS TEAMS AND LEAGUES

(71) Applicant: YouRulz, Inc., Orlando, FL (US)

(72) Inventor: Eric D. Martin, Hawthorne, FL (US)

(73) Assignee: YouRulz, Inc., Hawthorne, FL (US)

( * ) Notice: Subject to any disclaimer, the term of this patent is extended or adjusted under 35 U.S.C. 154(b) by 0 days.

(21) Appl. No.: 15/978,188

(22) Filed: May 13, 2018

(65) Prior Publication Data

US 2018/0280811 A1    Oct. 4, 2018

Related U.S. Application Data

(60) Provisional application No. 62/471,179, filed on Mar. 14, 2017.

(51) Int. Cl.
| | |
|---|---|
| A63F 9/00 | (2006.01) |
| A63F 13/828 | (2014.01) |
| A63F 13/79 | (2014.01) |
| A63F 13/533 | (2014.01) |
| A63F 13/87 | (2014.01) |
| A63F 13/44 | (2014.01) |

(52) U.S. Cl.
CPC ............ *A63F 13/828* (2014.09); *A63F 13/44* (2014.09); *A63F 13/533* (2014.09); *A63F 13/79* (2014.09); *A63F 13/87* (2014.09)

(58) Field of Classification Search
None
See application file for complete search history.

(56) References Cited

U.S. PATENT DOCUMENTS

| | | | | |
|---|---|---|---|---|
| 8,851,998 | B2* | 10/2014 | Pawson | A63F 13/828 463/42 |
| 9,474,960 | B1* | 10/2016 | Lundschen | A63F 13/12 |
| 10,248,290 | B2* | 4/2019 | Galfond | G06F 3/0482 |
| 2011/0230243 | A1* | 9/2011 | Hereford | G07F 17/32 463/1 |
| 2012/0149472 | A1* | 6/2012 | Miller | A63F 13/85 463/42 |
| 2012/0289340 | A1* | 11/2012 | Pawson | A63F 13/12 463/42 |
| 2014/0045595 | A1* | 2/2014 | Baschnagel, III | A63F 13/10 463/40 |

(Continued)

*Primary Examiner* — Seng H Lim
(74) *Attorney, Agent, or Firm* — Steven A. Wood, Esq.

(57) ABSTRACT

A method of using, computer software implementing, and a system for allowing a fantasy sports contest application to provide to a user the ability to substitute bench players for active players prior to or during a corresponding live game. The method is implemented by computer software executed on a system comprising plurality of computers, including: a user interface, a player performance stats tracking mechanism configured to track stats from each player's game, a game clock reader that reads a game clock from each player's game, a database configured to store game clock times and player stats, including player active and inactive statuses, a substitution mechanism configured to substitute a bench player for an active player, a point tallying mechanism configured to tally points based on active player stats, and a stats projection update mechanism configured to provide real-time player stats projection updates.

20 Claims, 11 Drawing Sheets

(56) References Cited

U.S. PATENT DOCUMENTS

| | | | |
|---|---|---|---|
| 2015/0005072 A1* | 1/2015 | Lempel | A63F 13/65 463/42 |
| 2016/0045825 A1* | 2/2016 | Kehoe | A63F 13/795 463/29 |
| 2017/0036122 A1* | 2/2017 | Lundschen | A63F 13/12 |

* cited by examiner

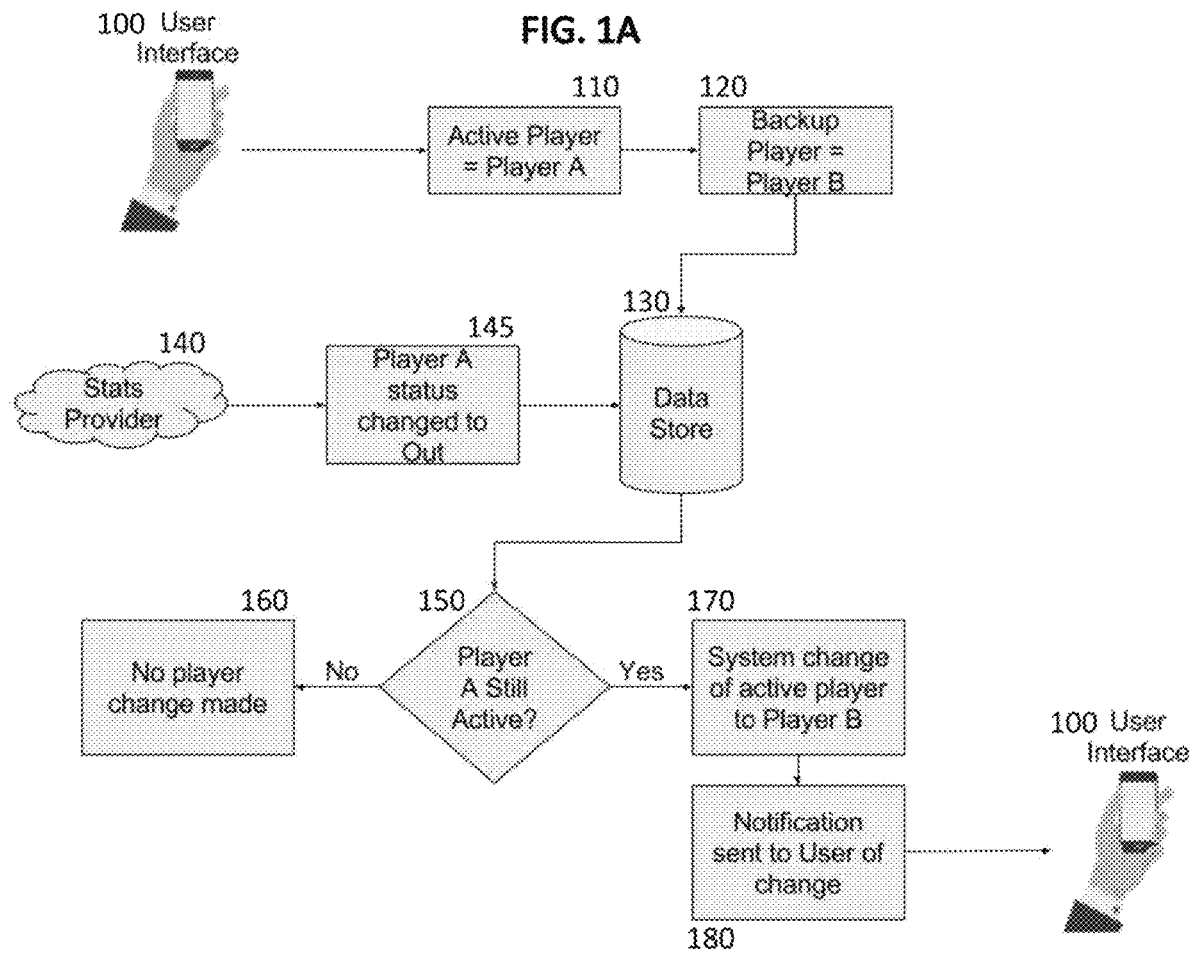
FIG. 1A
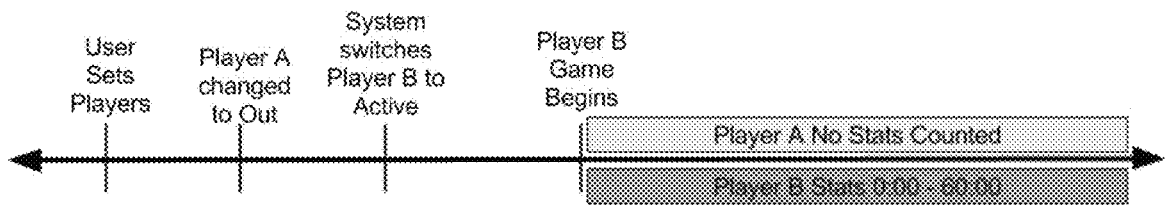
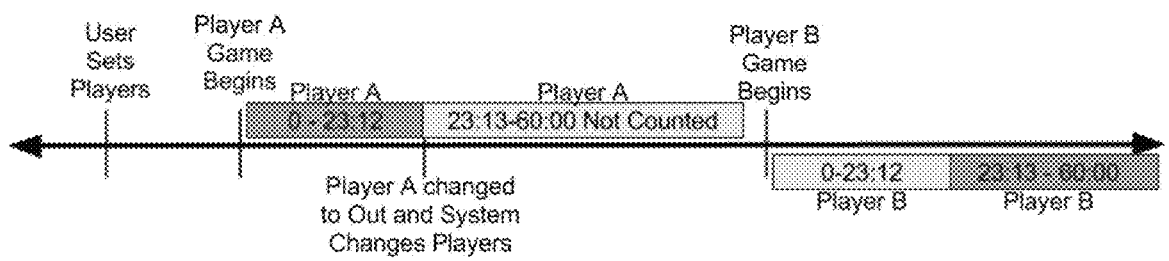
FIG. 1B

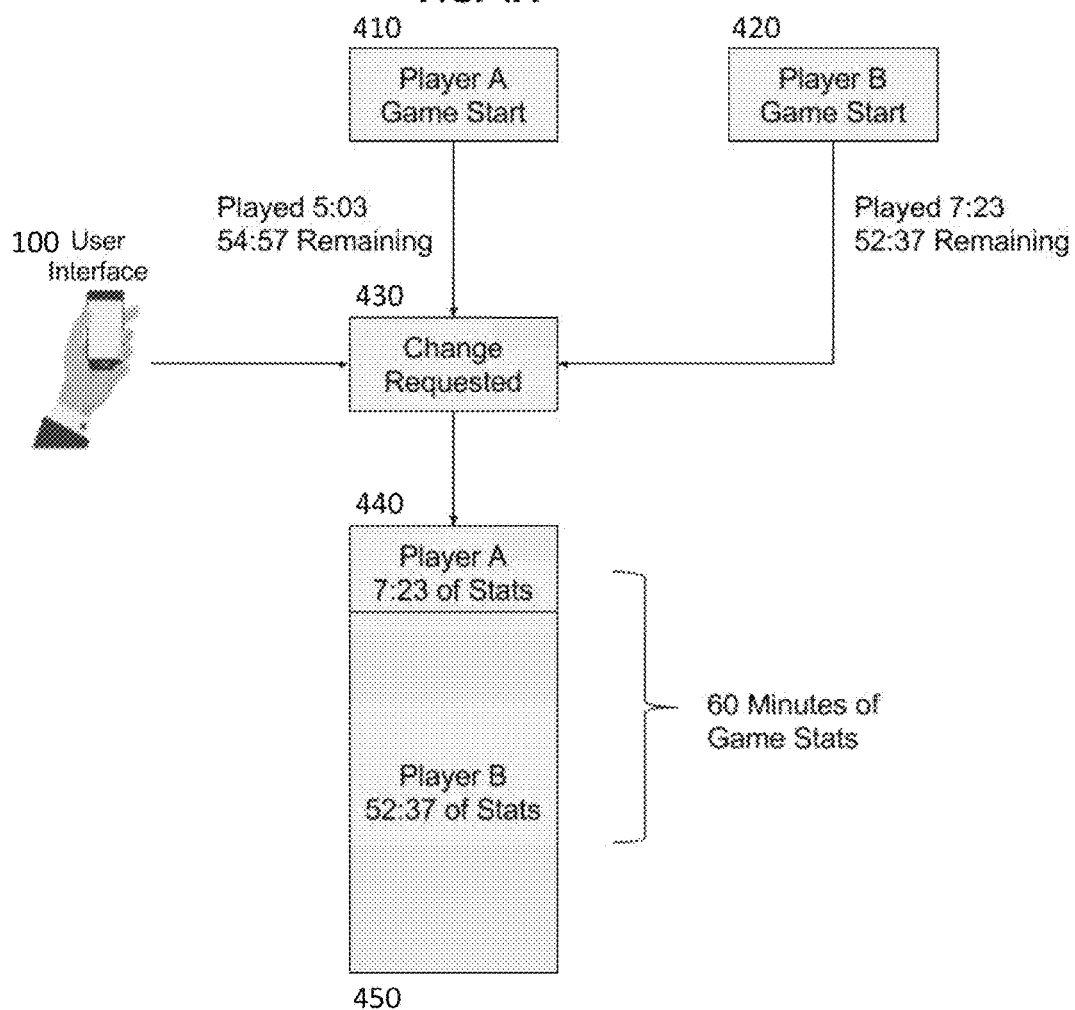
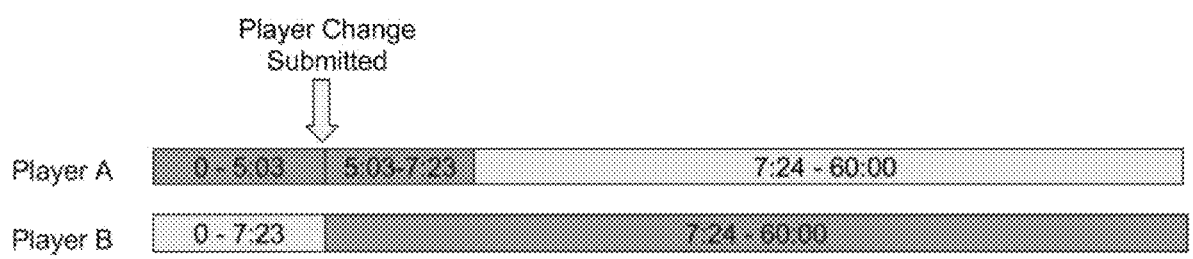

SYSTEM AND METHOD FOR MANAGING FANTASY SPORTS TEAMS AND LEAGUES

CROSS REFERENCE TO RELATED U.S. PATENT APPLICATIONS

This application is a non-provisional of, and claims the benefit under 35 U.S.C. § 119(e) of the earlier filing date of U.S. Provisional Application Ser. No. 62/471,179, filed on Mar. 14, 2017, which is hereby incorporated in entirety by reference.

BACKGROUND

1. Field of the Invention

The present invention relates to fantasy sports and, in particular, to methods, systems, and software for managing fantasy sports leagues, in particular for managing fantasy sports teams, especially during live contests and game play.

2. Description of Related Art

Many millions of people play fantasy sports leagues. In fact, over 30 million people actively play fantasy football alone. Fantasy league players typically participate in leagues organized by friends and co-workers or in leagues set up by various fantasy websites. In fantasy football, leagues are generally limited to 12 teams or less.

Leagues generally draft their players from all NFL players and each player is allowed only allowed to be on a single roster. Players usually set weekly rosters, make trades, pick up available players and run their team like a general manager (GM). League play normally ends with two games left in the season, with the last two games serving as the playoffs. With this schedule, League winners are determined by the end of the regular season.

Most fantasy sports websites allow participants to create a league, join a league or activate their previous league. Many fantasy web sites are free to play, while others charge a premium but provide more data such as statistics, expert analysis, trends, live data, injury reports, etc.

For fantasy football, Yahoo.com currently has the most utilized site followed by ESPN.com and then NFL.com. Revenue for these sites is generated through advertising and player purchased expert advice (e.g., ESPN Insider paywall). Adweek estimates that fantasy football is a billion-dollar business.

One of the commonly heard and often written about negatives or limitations for fantasy football players is that existing fantasy sports applications provide no or only limited ability to make changes to rosters in real time.

WO2016019301, by Hills et al., appears to be directed specifically at Daily Fantasy and to concern an "illegal" substitution, but there seems to be no definition of what is "illegal". Hills describes that a contestant may substitute a "Free Agent" as well as players on their roster. This makes the system operate less like the real sport because real teams cannot add players to a roster in the middle of a game. While this system does disclose the ability to change a roster in real time, it suffers from limitations that prevent it from fully or most closely simulating real game play. In addition, many rules remain undefined, like what happens in overtime, what constitutes and "illegal" swap, etc.

US20150038232A1, by Mikus et al., describes use of a master time clock to facilitate the use of real-time data from the stats provider, but requires information about the game clock to be provided with every play received. But, with the game clock information it is easy to determine how long a player has played, so there really seems to be no need to synchronize to a master time clock as described.

US20140274411A1, by Moffett, appears to be primarily directed to automatic substitutions. One major difference with systems that attempt to fully or most closely simulate real game play is that Moffett allows automatic substitutions to count points previously generated by a player. Further, in describing discretionary swaps, Moffett implies that they use the time of the user's device. This is a risk as a user could have an incorrect time, or could change their time purposefully to take advantage of the system.

US 20150005072A1, by Lempel, appears to enable real-time roster changes automated by the system, but only based on game situations. Lempel lists examples of specific game situations, including "3rd and Long" and "4th and Inches". So, Lempel implies having multiple situational lineups within a specific game and changing out players based on the situation. For example, these days most teams have a special 3rd down running back. And so, the system of Lempel would swap out the first down back for the 3rd down back on 3rd downs.

U.S. Pat. No. 9,474,960B1, issued to Lundschen, discloses a fantasy sports application for real-time in-game roster changes, based on a "forfeit" period. Lundschen describes this as forfeiting the last stat line for the active player and the first stat line of the inactive player once a requested substitution is submitted and the new player's status changes to active.

Lundschen also describes a position clock for each player where time is subtracted from each player as a stat feed is received. Because a stat feed for a player is not received for every single play, only on plays the player is involved in, this is a flawed method for calculating game time. A Running Back who is in the game but does not touch the ball for a play will not have a stat feed.

In addition, limitations exist for many fantasy sports systems that offer a "Salary Cap" functionality. Current systems all use made-up salaries and salary caps based on these made-up salaries. The made-up salaries are based on a player's performance, and in a Daily Fantasy league the salaries can change from week to week, based on prior week's performance.

In addition, there are currently no fantasy sports systems that integrate actual Player salaries and recommend a salary cap based on the actual League Salary Cap. There is a new system that uses a salary cap and contract lengths, but it is not based on the actual Player salary caps or salaries. Players just go up for auction and the highest bidder obtains them.

None of the following patents or applications specifically describe how the salaries are calculated. It may be possible that they use the Fanduel or DraftKings salary data which is available from some of the statistics providers.

US20160263483A1, by Le, appears to be a generic fantasy sports patent that talks about many of the basic features and functions available in almost every site today. It's references to Salary Cap appear to be in line with my description above, and unrelated to our patent.

US20170136365A1, by Hwang, appears to be for a gaming system, similar to a slot machine based on the figures. However, it's references to Salary Cap also appear to be similar to the description of Le above. This can be seen in diagram on page 7 where the example shows a Salary Cap Expended of $100 k. This has no relation to the actual NFL salaries or caps. There is also no information on how to calculate the salaries or caps, so it cannot be re-created from this applications information.

US20160354698A1, by Gotkin, appears to have several differences from most fantasy systems today. However, the salary cap portion is still based on un-realistic information and is not based on an actual player's salary or the leagues cap. This can be seen in most of the diagrams.

US20170165581A1, by McAuley, presents an interesting take on fantasy sports by using the salaries to determine a probability of winning, the salaries and caps are again based off of the Daily Fantasy Sports model. This can be seen in the diagram in paragraph 35. In the figure, Tom Brady is shown with a salary of $7,800. However, Tom Brady's actual salary is $14 M per year. So, in a weekly type of league that would be $823,529 per game over the 17-week season.

Accordingly, what is needed and previously unavailable, is a fantasy sports league which addresses the dilemma and/or a lack of participation during playoffs. Also, what is needed is a system and method for providing notifications to users of when a roster move is required. The present disclosure addresses these and other needs.

SUMMARY OF THE INVENTION

The following is a summary of the invention in order to provide a basic understanding of some aspects of the invention. This summary is not intended to identify all key or critical elements of the invention or to delineate the entire scope of the invention. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The present invention provides a system, method and software to incorporate the ability to both automatically and manually make changes to rosters in real time, which is useful in the context of league rules and scoring.

The present invention further comprises a method to allow people to change players from "Active" to "Bench" status during a game by substituting in a new player to take the place of the prior active player. By storing the real-time data historically, we can determine how much time a player has played in a game when a change is made and then allocate points accordingly.

For example, a change is made after 10 minutes of the game has been played. Player A will have points for the first 10 minutes counted and player B will have points for the remaining 50 minutes counted. Real Time data has been available since the late 1990s, and although this data has existed for almost 20 years no one has yet provided a system capable of enabling real time In-Game roster changes based on this data.

In addition, there are currently no fantasy sports systems that integrate actual Player salaries and recommend a salary cap based on the actual League Salary Cap. This is a feature that will truly give an experience of being a General Manager.

In the present invention, we apply a player's actual league salary and base the salary cap off of the league salary cap and adjust it based on the fantasy team sizes compared to actual team sizes. This is a major difference over how all current competing systems work today and enables a fuller, more close simulation of real game play.

The present invention comprises a non-transitory computer-readable medium comprising computer software for using a fantasy sports contest application to provide to a contestant the ability to substitute bench players for active players prior to or during a corresponding live sports game, where the computer software is executed on a plurality of computers, including a user interface, in conjunction with memory, bus elements and network, the computer software comprising: 1) code establishing a player performance stats tracker configured to track stats from each player's game; 2) code providing a game clock reader configured to read a game clock from each player's game; 3) code establishing a database housed on one or more non-transitory computer readable media, wherein the database is configured to store game clock times and player stats, including player active and inactive statuses; 4) code enabling substitution of a bench player for an active player; 5) code tallying points obtained based on the performance stats of each active player; and 6) code providing a real-time player stats projection updates.

The present invention also comprises a system for a fantasy sports league, comprising: 1) a database storing a plurality of fantasy players; 2) a plurality of user interface devices connected to the database over a network, wherein the user interface is configured to enable a contestant to select a fantasy team of fantasy players and wherein the selections made through the interface on the user interface devices are stored in the database; 3) one or more servers comprising a cloud-based stats provider; 4) a player performance stats tracker configured to track stats from each player's game; 5) a game clock reader configured to read a game clock from each player's game; 6) a database housed on one or more non-transitory computer readable media, wherein the database is configured to store game clock times and player stats, including player active and inactive statuses; 7) a substitution mechanism enabling substitution of a bench player for an active player; 8) a fantasy points tallying mechanism enabling accrual of points obtained based on the performance stats of each active player; and 9) a player stats projection real-time update mechanism providing real-time updates of player stats projections.

The present invention further comprises a method for a fantasy sports league, comprising: 1) providing a plurality of fantasy players on a database; 2) connecting a plurality of remote user interface devices to the database over a network; 3) receiving input from one of the plurality of user interface devices using an interface to select a fantasy team of fantasy players; 4) storing the selections made through the interface on the user interface devices on the database, comprising one or more non-transitory computer readable media; 5) providing player performance stats from each player's game to a player performance stats tracker; 6) providing a game clock time from each player's game to a player game clock tracker; 7) storing game clock times and player stats, including player active and inactive statuses on the database; 8) tallying fantasy game points obtained based on the performance stats of each active player; 9) providing player stat projection updates in real-time; 10) substituting a bench player for an active player; and 11) notifying, via the fantasy league server, any of the plurality of user interface devices that a change to the selected fantasy players has been made.

These and other aspects of the present invention are realized in an improved system and method designed to facilitate management of fantasy sports game and league play, as shown and described in the following FIGs and related description.

Additional features and advantages of the invention will be set forth in the detailed description which follows, which, taken in conjunction with the accompanying drawings, by way of example, together illustrate the features of the present invention, which will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, explain the principles of the invention. The drawings are only for the purpose of illustrating one or more preferred embodiments of the invention and are not to be construed as limiting the invention.

Non-limiting and non-exhaustive features will be described with reference to the following figures, wherein like reference numerals within the detailed description refer to like parts throughout the various figures. The figures described below were not intended to be drawn to any precise scale with respect to size, angular relationship, or relative position. Various embodiments of the present invention are shown and described in reference to the numbered drawings wherein:

In the drawings:

FIGS. 1A and 1B depict a first scenario for an automatic player substitution to a backup player.

FIGS. 2A and 2B depict a second scenario for an automatic player substitution to a backup player.

FIGS. 3A and 3B depict a first scenario for a manual real-time, in-game player substitution.

FIGS. 4A and 4B depict a second scenario for a manual real-time, in-game player substitution.

Figure 5A:
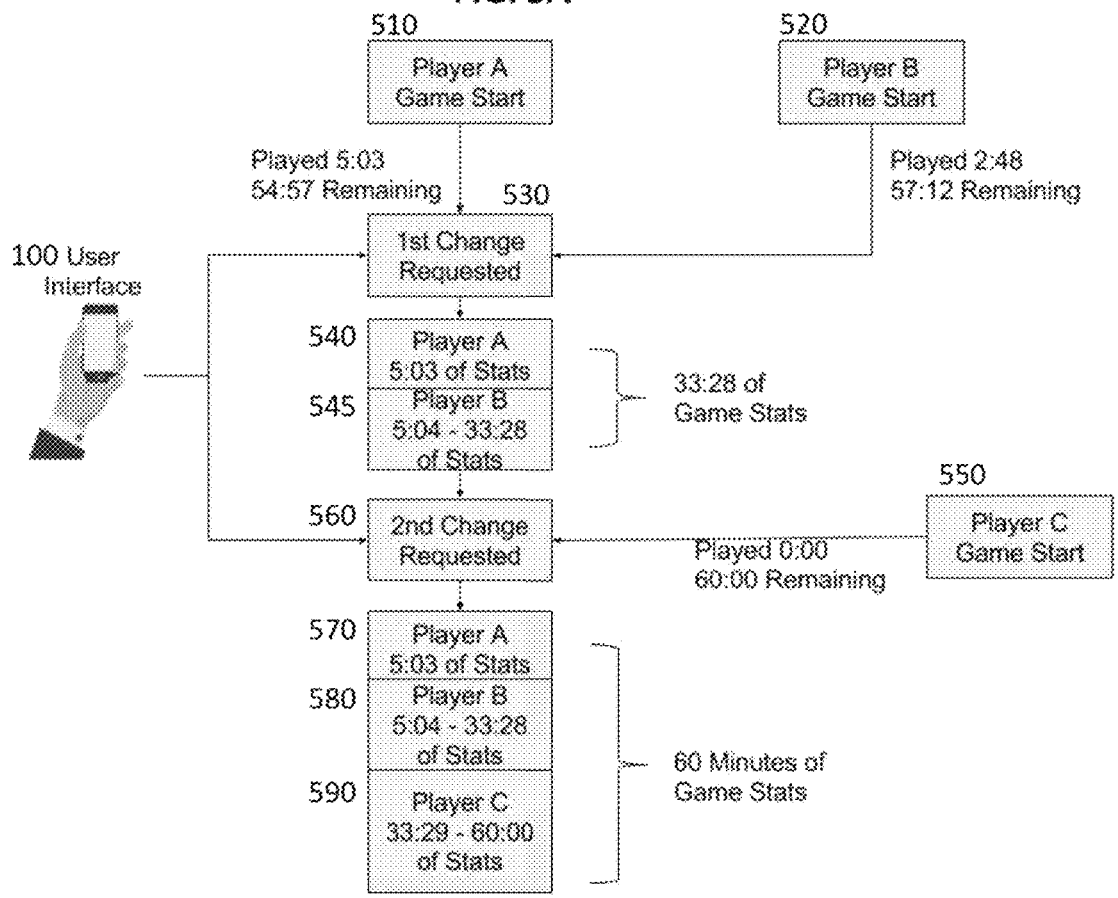

FIGS. 5A and 5 B depict a third scenario for a manual real-time, in-game player substitution.

Figure 6A:
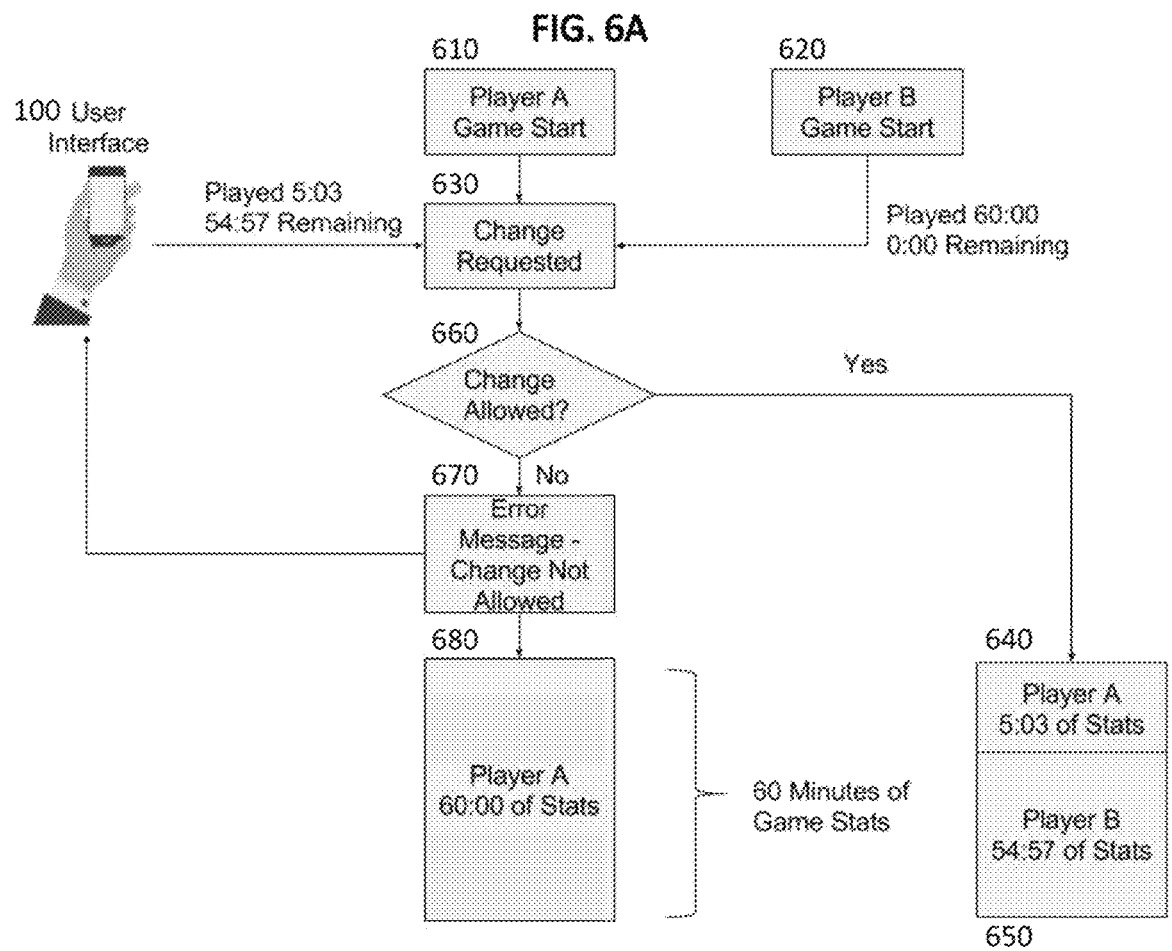
Figure 6B:
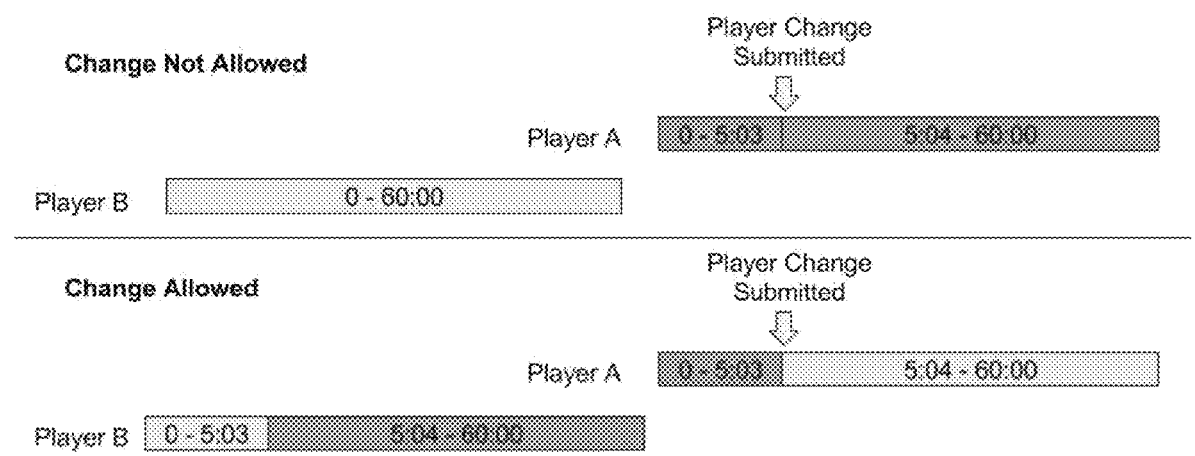

FIGS. 6A and 6B depict a fourth scenario for a manual real-time, in-game player substitution.

Figure 7A:
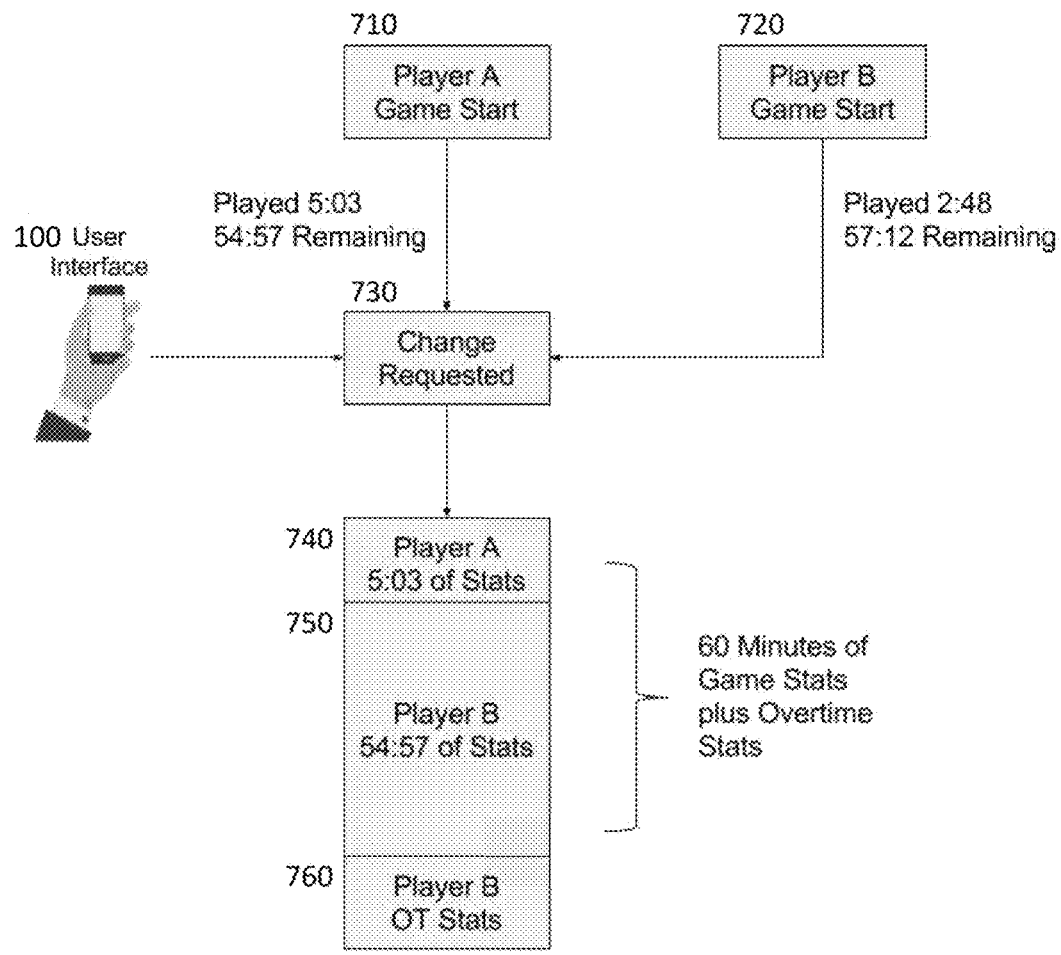
Figure 7B:
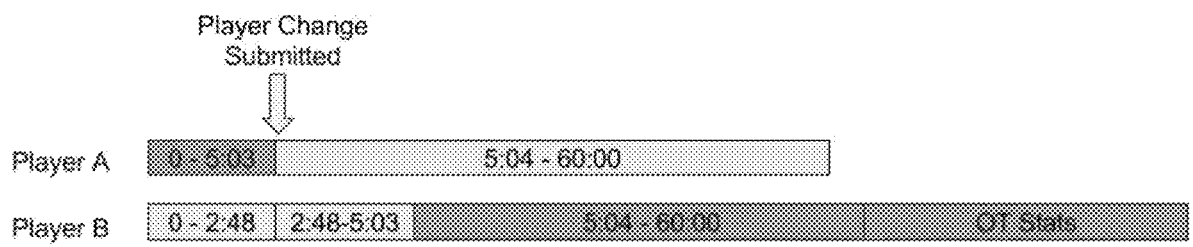

FIGS. 7A and 7B depict a fifth scenario for a manual real-time, in-game player substitution.

Figure 8A:
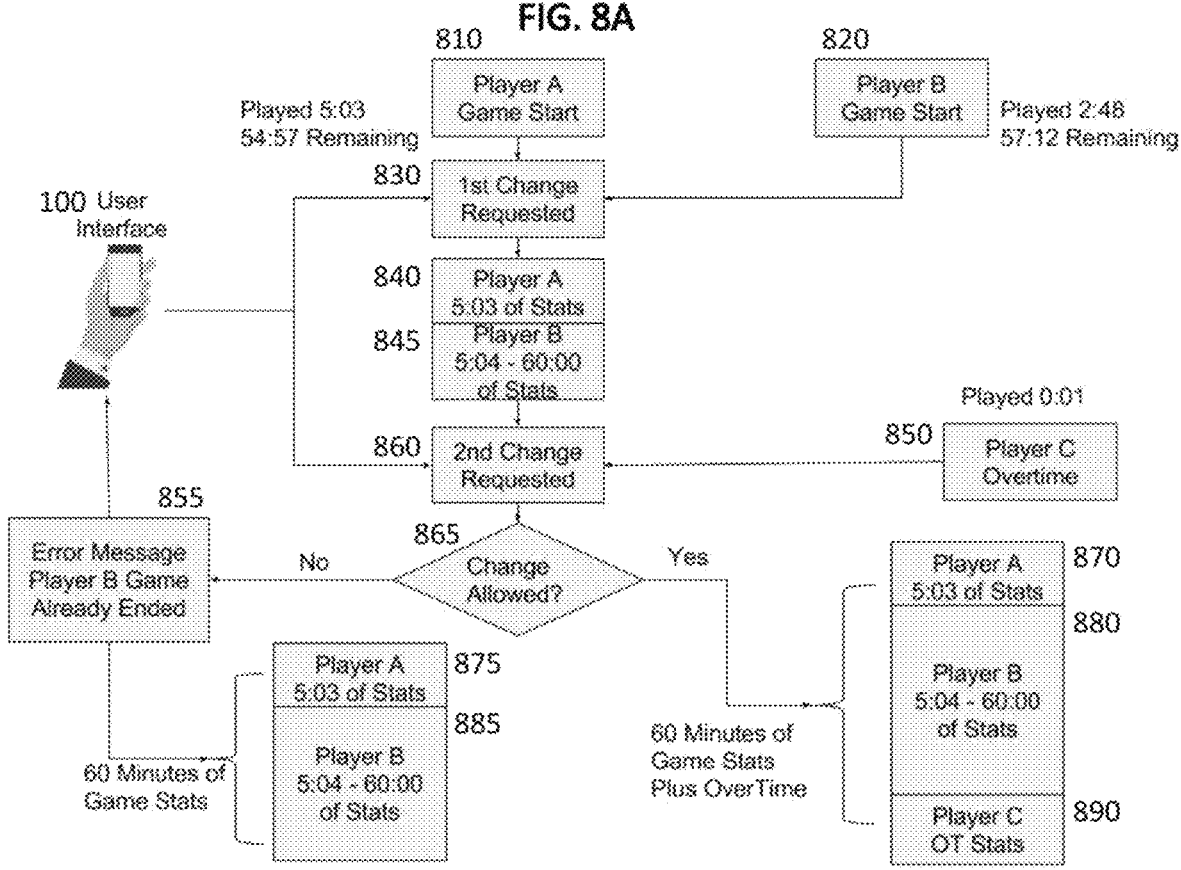
Figure 8B:
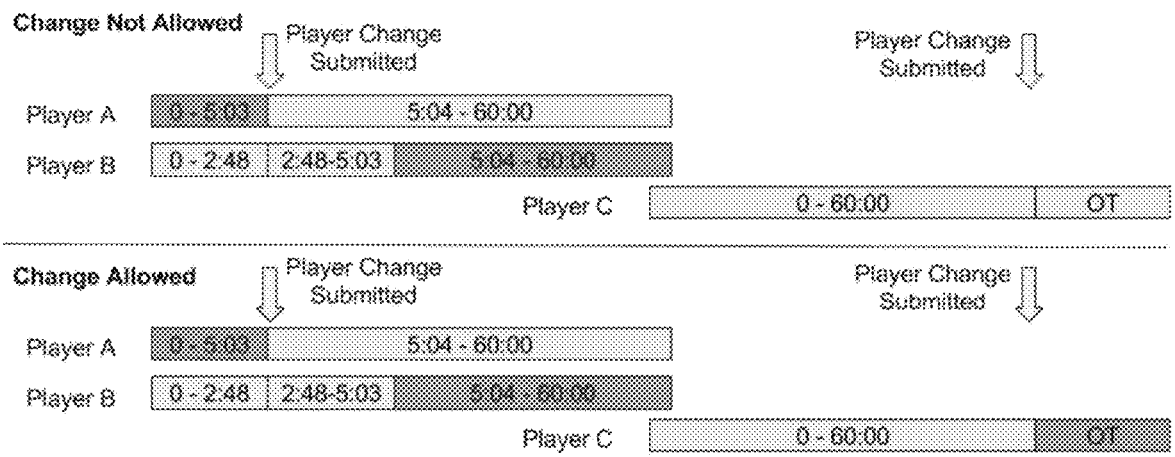

FIGS. 8A and 8B depict a sixth scenario for a manual real-time, in-game player substitution.

Figure 9A:
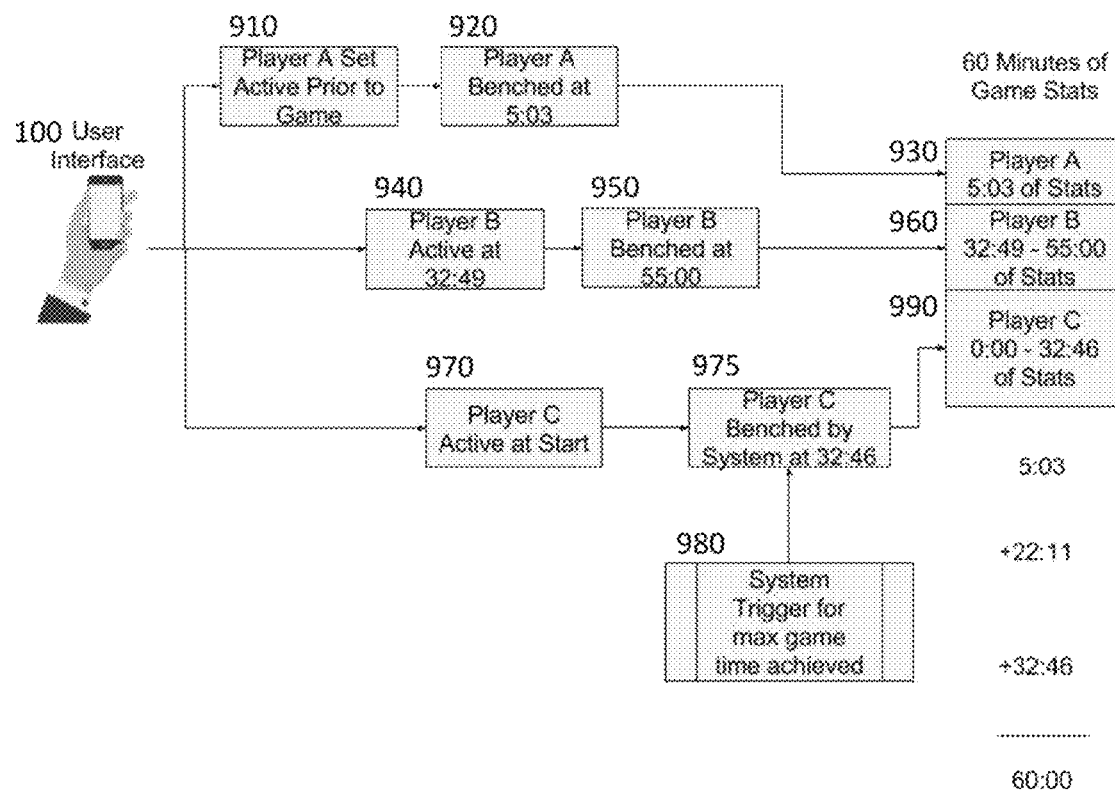
Figure 9B:
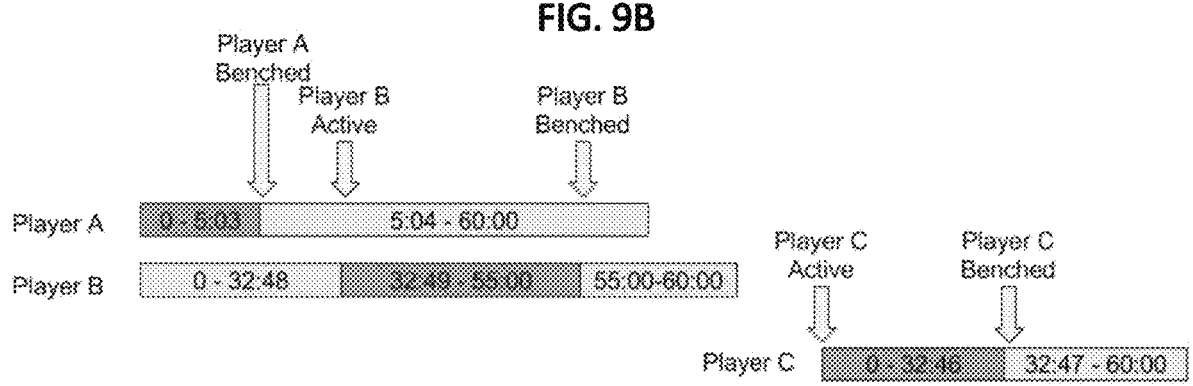

FIGS. 9A and 9B depict a seventh scenario for a manual real-time, in-game player substitution.

Figure 10:
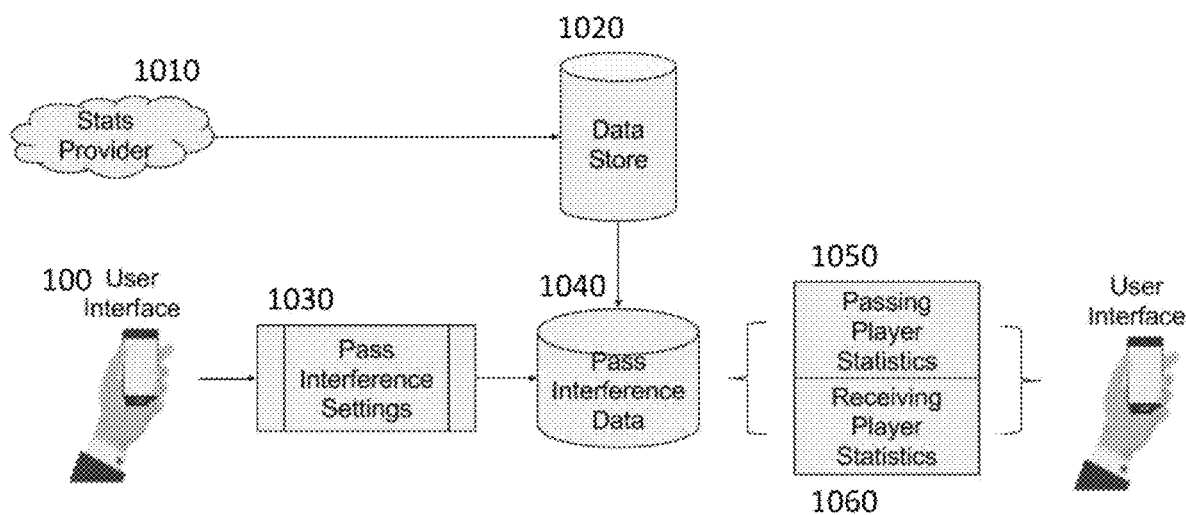

FIG. 10 depicts a system that manages a pass interference situation for fantasy sports game play.

Figure 11:
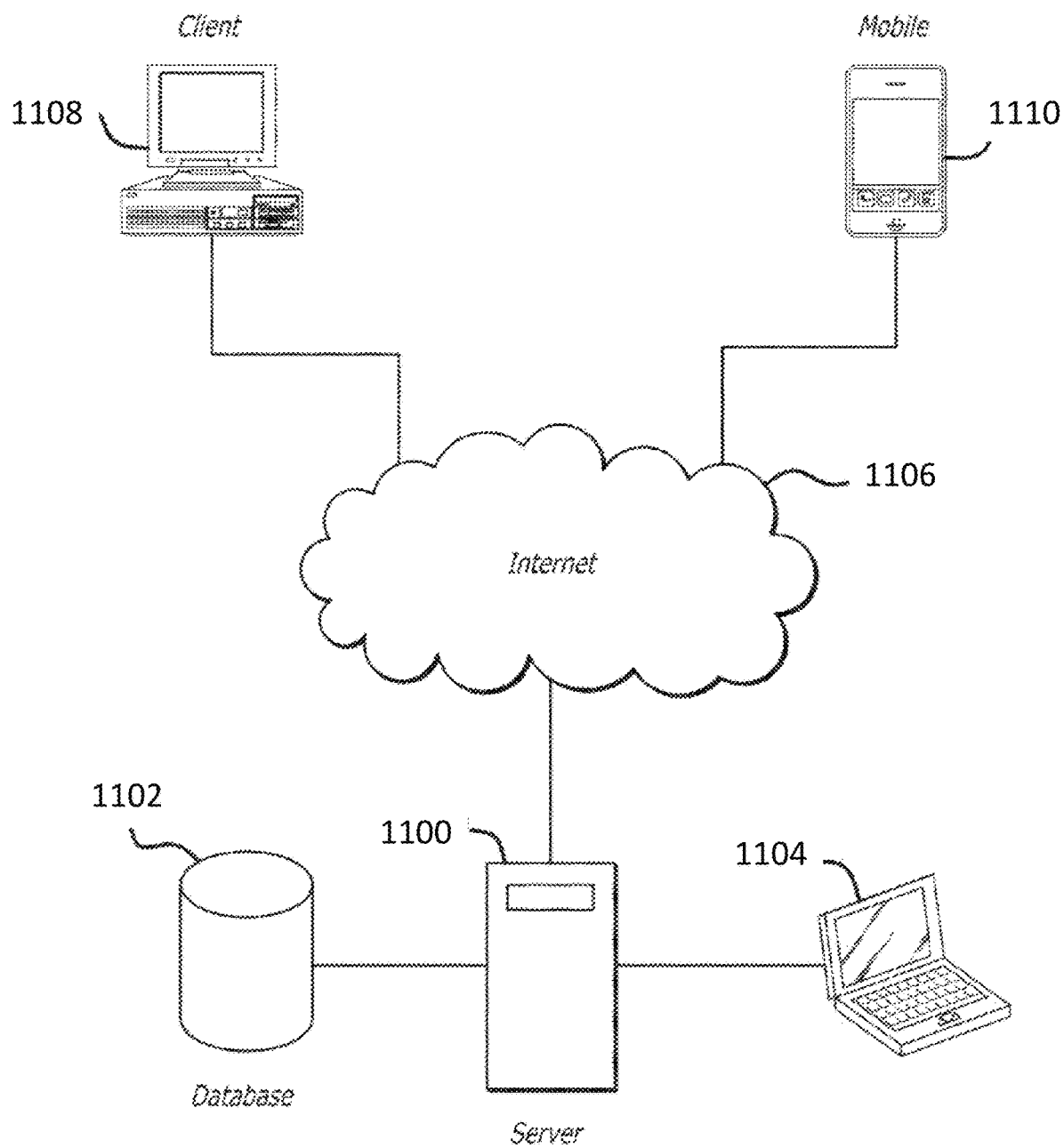

FIG. 11 depicts a representation of the physical system over which the fantasy sports software system and method is employed.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIG, and as such, multiple FIGs are presented to separately illustrate the various details of the invention in greater clarity. Similarly, not every embodiment need accomplish all advantages of the present invention.

DETAILED DESCRIPTION OF THE INVENTION

The invention and accompanying drawings will now be discussed so as to enable one skilled in the art to practice the present invention. These, and other, aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims.

Many changes and modifications may be made within the scope of the present invention without departing from the spirit thereof and the invention includes all such modifications.

The present invention is of a method, system, and computer software embodied on non-transitory computer-readable media for engaging in fantasy sports activities, particularly in managing a league involving multiple players each handling a single team.

The following describes how this invention applies to fantasy sports league management systems. This assumes the framework of the current fantasy model whereas fantasy player results are derived from real world player game performances.

In traditional fantasy sports team play, contestants were not allowed to change the Active status of a fantasy player once that player's real-world game had started. People often get frustrated when a player on their bench outscores an active player. This system will allow fantasy owners in leagues to substitute bench players for active players on their roster while the game is in progress. This feature will allow people more control of their fantasy teams.

The present invention allows owners to substitute active fantasy players with inactive fantasy (bench) players from their team as the real-world players participate in the real-world games. This invention incorporates a substitution mechanism that is viable and equitable for the competitive interests of all the contestant participants.

This affords fantasy players greater flexibility and control over the outcome of the fantasy competition greatly enhancing the fantasy gaming experience and enabling the contestants to have a more realistic and active owner, general manager, or coach style of game-play. However, a player must already be on a contestant's roster in order for a proposed substation to be effective and substitutions to "free agents", or players not included on a contestant's roster are not allowed.

The invention is based on the current model of fantasy football (as well as other sports) in which the contestants participate in an online fantasy league. The league is created by a commissioner who is also a contestant in the league and acts as a league manager and oversees the league operation. As discussed, the present invention provides a method of playing fantasy football that allows substitutions while the game is in progress.

For purposes of the specification and claims, the following terms are defined as stated. 'Active' means that a given player has an in-game, active player status on a contestant's roster. 'Out' means that a given player has a benched, injured, suspended, or ejected status on a contestant's roster. 'Contestant' means a fantasy sports system user who creates a fantasy sports team that competes against other fantasy sports user teams. Typically fantasy sports teams and users are broken up by leagues, and leagues are typically regulated by league organizers or 'Commissioners'. 'User interface' means web browsers, native apps or other platforms on a stand-alone client terminal, such as a computer kiosk, tablet, desktop, laptop, smart phone, smart watch, smart TV, or other specialized piece(s) of hardware.

The present invention preferably comprises several major components, some of which may or may not be included in each of the various embodiments described below: 1) a user interface (100 in the respective FIGs.), 2) a game clock, 3) a stats provider (140 and 240 in the respective FIGs.), 4) a data store (130 and 230 in the respective FIGs.) comprising a non-transitory computer readable media, 5) a performance stat tracking mechanism (145 and 245 in the respective FIGs.), 6) a substitution mechanism, comprising a threshold trigger (250 in FIG. 2A) or a manual player substitution mechanism (330, 430, 530, 560, 630, 730, 830, and 860 in the respective FIGs.), 7) a performance stat real-time projection update mechanism (235 in FIG. 2A), and a substitute scoring mechanism.

These components allow contestants to maximize the utility of the players available on their rosters by using multiple players to generate active points for a given position. Statistical feeds include time stamps, and other metadata including location (e.g., stadium or arena), other players involved in a play (e.g., useful for pass interference and other penalty plays, such as offsides), which allow the system to determine points accrued for a fantasy sports contest based on one or more real-world games.

Usually, the commissioner creates the league based upon a set of rules that all contestants have agreed to follow. These rules determine the scoring parameters as well as game play boundaries. The contestants then draft real world players to their team to create a fantasy team. As the real-world players participate in real world games, their performance and stats determine the scores that accrue on behalf of a contestant's fantasy team, in accordance with the league's customized scoring format.

Contestant's in a league compete against other contestants in the same league in a head to head format which produces a win-loss record that determines participation in "playoffs" at the end of the fantasy regular season.

The outcome of a fantasy competition is determined based on the accumulated points generated by the performance stats for each team's Active players for that week. The fantasy team that generated the most fantasy points based on that week's real-world competitions wins that week's head to head matchup.

The statistical data exists to provide compelling new features and is is available through several providers, yet no one has thought to provide these features to advance fantasy sports towards a more real-time game, giving the players the feeling of being a coach and/or general manager in the NFL, or any other sports league. The present invention can apply to any fantasy sports game, and covers both Season Long and Daily type fantasy sports play.

In contrast to Moffett, discussed in the Background, game times are managed by the server in our invention. For example, when a user requests a change, the server logs in GMT the request with the server time and also the time of the game in question. This information is used in combination with the real-time data feeds which are also time stamped. In addition, contrary to Lundschen, described above in the Background, our method does not require any forfeit period, enabling substitutions to take immediate effect and giving a more realistic, real-time control over the game dynamics.

Our method uses a combination of the game clock, the stats feeds for the game as a whole, as well as stat feeds for a player, to determine actual game time. In contrast to competing systems adverstised online, our system enables substitutions for both defensive and offensive players, as well as for defense and offense special teams.

Substitution Scenario 1—Backup Player Change Prior to Game Start

FIGS. 1A and 1B depict a first embodiment of backup player change contemplates an automatic change in player status to "Out". A player status can automatically change to "Out" for two primary reasons, including penalty and injury. Two primary scenarios exist for an automatic change in player status: either 1) a player is benched prior to the start of a game due to injury or other reason (e.g., suspension, etc.) or 2) a player is ejected during a game due to penalty or withdrawn from or benched during a game due to injury.

If the change in status occurs during game play, the same rules for a contestant initiated in-game player substitution apply, with the stats tallied for Player A during the time Player A's status was "Active" or "in-game". Contemporaneous with or subsequent to Player A's status automatically being changed to "Out", a backup player on contestant's roster, Player B, is selected to replace or substitute for Player A.

If Player B's game is in session at the time Player A's status changes, stats will immediately begin to tally for Player B upon Player A's status change. This is true for both cases where Player A's status changes prior to Player A's game and also for cases where Player A's status changes during Player A's game.

However, stats will only tally for Player B until Player B's game concludes or until Player B has played sufficient time that Player B's time plus Player A's time equals a full game's worth of time played. If Player A's status changes prior to the start of both Player A's game and Player B's game, then Player B may play and collect stats for a full game.

But, if Player B's game concludes and Player B's time played plus Player A's time played does not equal a full game, then a second backup player on contestant's roster, Player C, may be allowed to play and collect or tally stats on behalf of contestant. If the league in question has no restrictions on the number of substitutions that can be made, this sequence can happen repeatedly for any number of players until a contestant has accumulated a full game's worth of stats for the player position in question.

For instance, if Player A's game is scheduled for Monday and Player B's game is scheduled for the immediate preceding Sunday, and player A injures himself at a barbeque on Saturday and the news hits the following day, Sunday, that Player A is "out", either during or before Player B's scheduled game, then Player B will be immediately tapped to tally stats for contestant.

As seen in FIG. 1A, a first step 110 enabled by the software and method of the system is the selection of a first active player, Player A. A second step 120 enabled by the software and system is to select a backup player, Player B. These selections are stored in a data store 130, comprising a non-transitory computer readable media.

A stats provider 140, residing in the cloud, transfers stats for Player A (and other players, e.g., Player B, Player C, etc.) to the data store 130, via the internet (or other communications network, such as a cellular network, direct Wifi network, or direct LTE network). The stats provider 140 also registers changes in player status (i.e., Active or Out) with the data store 130. For instance, in a third step 145 of the software and system, the stats provider registers the change in Player A's status to Out with the data store 130.

Next, the software and system conduct a fourth step 150 to check whether Player A's status is still Active on the contestant's roster. If the answer to this question is no, the software and system take a fifth step 160 and make no player change. But, if the answer to this question of the fourth step 150 is yes, then the software and system will take a sixth step 170, to change the status of Player B to Active, and a seventh step 180, to notify the user or contestant of the player change, via the user interface 100. If Player A is still Active in the contestant's roster, the system will swap them out to player B, but, if Player A is already inactive in the contestant's roster the system does not need to make a change.

FIG. 1B depicts a timeline for stats accumulation by Player B in the example detailed in FIG. 1A. Again, if Player B happens to be in-game when Player A's status is changed to Out, then Player B's status will be changed to Active and stats for Player B will immediately begin to accumulate. League rules may also allow for all of Player B's stats from Player B's entire game to be counted for the contestant in question, since the contestant did not anticipate that Player A would become inactive or switched to Out status.

Substitution Scenario 1—In-Game Backup Player Change

Figure 2A:
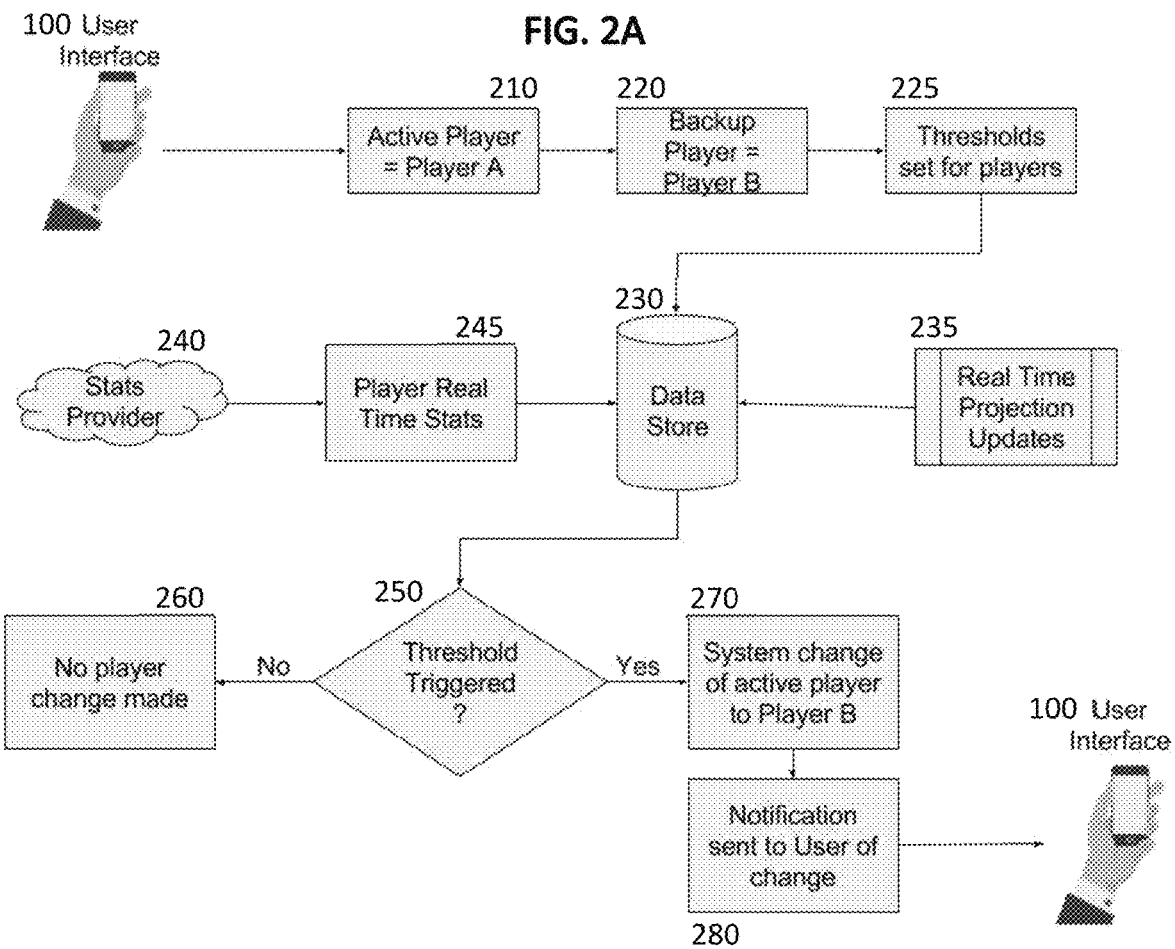
Figure 2B:
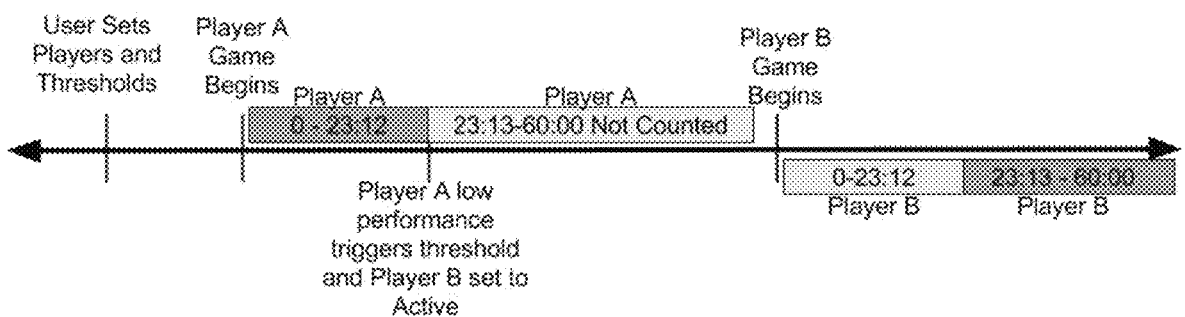

Alternatively, as depicted in FIGS. 2A and 2B, a contestant may set performance thresholds or criteria, enabling the system to automatically monitor the player's performance and to trigger an in-game substitution to a backup player, if the performance thresholds are not met.

For example, a contestant may set a substitution trigger based on maximum number of interceptions, e.g., for a quarterback or a receiver position, and if the threshold number of interceptions is met for the player in question, Player A, that event triggers the in-game substitution to replace Player A with backup Player B.

In another example, the contestant may set a minimum number of rushing yards to be acquired by a running back within a specified duration, e.g., first quarter, first half, etc., and if the player in question, Player A, does not meet the threshold number of yards within the required timeframe that event will trigger the in-game substitution to replace Player A with backup Player B.

For examples illustrating application of this mechanism to other sports, the threshold could be a number of strikeouts for baseball, a number of missed shots for basketball, hockey or soccer, a number of pit stops for racing, etc.

In the example depicted in FIG. 2A, the contestant has set thresholds in the system to automatically monitor a player's performance, and at 23:12 in Player A's game his performance drops below the set threshold. The system then immediately makes a player substitution to the designated backup player, Player B. The system also sends a notification to the contestant that the player substitution has been made.

Examples of specific thresholds include an in-game projection that Player A will fail to meet 80% of target projected stats for the game; Player A's in-game stat projections are less than (<) 95% of Player B's in-game stat projections; and Player A game time is greater than or equal ($\geq$) to 10:00 and Player A receptions are less than (<) 2.

As seen in FIG. 2A, a first step 210 enabled by the software and method of the system is the selection of a first active player, Player A. A second step 220 enabled by the software and system is to select a backup player, Player B.

A third step 225, enables the contestant to set thresholds for players' stats or other performance parameters, e.g., yards rushing, yards receiving, passes completed, receptions caught, passes blocked, sacks made, ratio of time played on the field to elapsed game time, etc. These selections are all stored in a data store 230, comprising a non-transitory computer readable media.

A stats provider 240, residing in the cloud, transfers stats for Player A (and other players, e.g., Player B, Player C, etc.) to the data store 230, via the internet (or other communications network, such as a cellular network, direct Wifi network, or direct LTE network). The stats provider 240 also registers changes in players status with the data store 230. For instance, in a third step 245 of the software and system, the stats provider registers players real time stats with the data store 230.

Further, the data store 230 is continuously provided with real time stats (performance parameter) projection updates 235, as available. The player real time stats 245 and the real time (stat) projection updates 235 are used to determine whether a threshold has been trigged in the fourth step 250.

Next, the software and system conduct a fourth step 250 to check whether the performance thresholds selected for Player A by the contestant have been triggered. If the answer to this question is no—i.e., no thresholds have been triggered, then the software and system take a fifth step 260 and make no player change. But, if the answer to this question is yes—i.e., one or more thresholds has been triggered for Player A, then the software and system take a sixth step 270, to change the status of Player B to Active, and a seventh step 280, to notify the user or contestant of the player change, via the user interface 100.

FIG. 2B depicts a timeline for stats accumulation by Player A and Player B in the example detailed in FIG. 2A. Again, Active status and stats for Player B may be deferred until Player B's game clock reaches the time on Player A's game clock plus one second (1 s) from the time that one or more of Player A's thresholds were triggered (i.e., 23:13), or, alternatively, Player B's status may be changed to Active and stats for Player B may begin to accumulate immediately if Player B happens to be in-game when Player A's status is changed to Out or as soon as Player B's game starts if Player B's game has not started at the time Player A's status is changed to Out.

Regardless, Player B's stats will only be accrued for contestant while Player B's status is Active, for a total time of game play equal to a full game, unless Player B happens to be in Active status when Player B's game goes into overtime, in which case, Player B's overtime stats may accrue for contestant, if league rules allow.

Substitution Scenarios 3—In-Game Manual Player Change with Gap Time

Figure 3A:
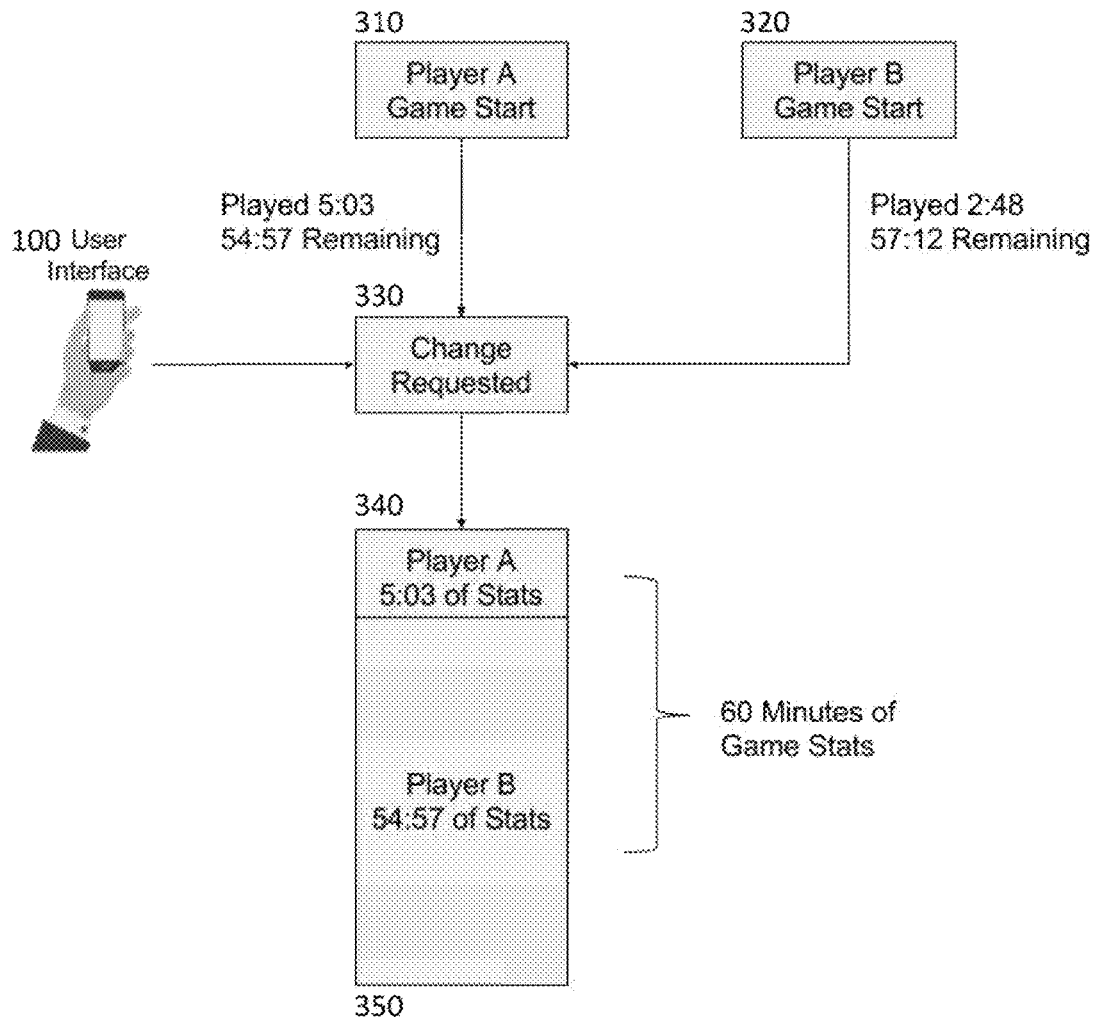
Figure 3B:
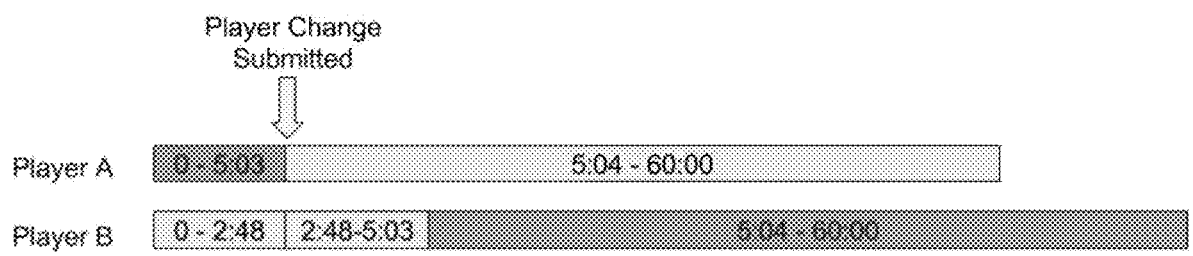

FIGS. 3A and 3B depict a user/contestant request to change players when the game of the active player, Player A, has played 5:03 of game time. When the change is requested, Player B's game has only played 2:48 of game time. So, Player A's stats will stop tallying as soon as the change is submitted, and stats for Player B will only tally until a full game's worth of time has been played.

For instance, by default configuration the system may not begin tallying Player B's stats until Player B's game clock counts to 5:04. This ensures that stats counted for Player B and Player A do not do derive from more than a full game's worth of time.

Alternatively, the contestant may select to have Player B's stats to begin tallying immediately upon submission of the substitution request, in which case, Player B's stats would tally only until there is 2:16 left in game time, at which point a full game's worth of time has been played between the time played by Player A and Player B.

In no instance will the total time played by Player A and Player B ever equal more than a full game's worth of game time, unless Player B's game goes into overtime while player B is the active player, in which case Player B's overtime clock and stats would be counted as well.

As seen in FIG. 3A, a first step 310 enabled by the software and method of the system is the commencement or start of a first game including the Active player on contestant's roster, Player A. A second step 320 enabled by the software and system is the commencement or start of a second game including an inactive player on contestant's roster, Player B.

A third step 330, enables the contestant to request a player substitution or a change in the "Active" player, from Player A to Player B. Blocks 340 and 350 show that stats accrued for Player A and Player B tally over a full game's worth of time.

FIG. 3B depicts a timeline for stats accumulation by Player A and Player B in the example detailed in FIG. 3A. In the example depicted, the player substitution is requested at 5:03 on Player A's game clock, with 54:57 in time remaining. At 5:03 on Player A's game clock, Player B's game clock reads 2:48.

Again, at the discretion of a league or at the election of a contestant, Active status and stats for Player B may be deferred and not begin accruing for contestant until Player B's game clock reaches the time of Player A's game clock at which the substitution was requested, plus one second (1 s), i.e., 5:04. Alternatively, if the league allows and the contestant elects, Player B's stats may begin accruing immediately and until Player B's clock reaches 57:45 (60:00−5:03 of Player A's game clock=54:57+2:48 on Player B's clock at the time the player substitution is requested=57:45).

However, for strategic purposes, this alternative method of stats accrual for contestant may be less desirable since it would preclude the opportunity to receive the benefit of overtime play, if Player B's game happens to go into overtime, as overtime would occur after a full game's worth of time had been played by both Player A and Player B and Player B's status had been switched to "Out".

Substitution Scenario 2—In-Game Manual Player Change with Overlap Time

FIGS. 4A and 4B depict a user request to change players when the game of the active player, Player A, has played 5:03 of game time. When the change is requested, Player B's game has played 7:23 of game time. So, while the change is requested at 5:03 of Player A's game time, a system default may be that stats will tally for Player A until Player A reaches 7:23 of game time.

Player B's stats will start to tally immediately, as soon as the change is submitted, until the end of Player B's game or until the contestant requests another substitution. Tallying stats for Player A and Player B simultaneously, from the time of the substitution request until Player A's game clock reaches 7:23, ensures that a full game's worth of stats will be tallied.

However, the scenario gets more complicated if contestant requests a substitution of Player B at 9:00 game clock time for game B, with Player A's game clock at only 6:40. For instance, if Player C's game is at 39:45 (of a 60:00 minute game) when the substitution request is made, Player C's remaining time could not possibly tally with Player A and Player B's times to total a full game's worth of time: 7:23 [Player A]+1:37 (9:00−7:23) [Player B]+20:15 [Player C]=29:15. In this case, contestant would have to select another substitution following the completion of Player C's game, possibly including Player A, Player B or another player, e.g., Player D, Player E . . . etc.

Alternatively, if Player C's game is at 3:15 when the substitution request is made, Player A's stats will immediately stop tallying at 6:40 on game clock A and Player B's stats also immediately stop tallying at 9:00 on game clock B: 6:40 [Player A]+1:37 [Player B]=8:17; 60:00−8:17=51:43, meaning that Player A's and Player B's stats immediately stop tallying upon the substitution request and Player C's stats tally from 3:16 to 54:59 on Player C's game clock.

In this case, even if Player C's game goes into overtime, contestant would not get the benefit of Player C's overtime stats because Player C had ceased to be an active player prior to the expiration of Player C's official game clock.

As seen in FIG. 4A, a first step 410 enabled by the software and method of the system is the commencement or start of a first game including the Active player on contestant's roster, Player A. A second step 420 enabled by the software and system is the commencement or start of a second game including an inactive player on contestant's roster, Player B.

A third step 430, enables the contestant to request a player substitution or a change in the "Active" player, from Player A to Player B. FIG. 4B depicts a timeline for stats accumulation by Player A and Player B in the example detailed in FIG. 4A. In the example depicted, the player substitution is requested at 5:03 on Player A's game clock, with 54:57 in time remaining. At 5:03 on Player A's game clock, Player B's game clock reads 7:23.

Again, Player B's stats may by default begin to accrue immediately and Player A's stats may also continue to accrue for a period of time equal to the difference between the two player's game clocks (i.e., 7:23−5:03=2:20), so Player A's stats will continue to accrue until Player A's clock reads 7:23, the time of Player B's clock at which the player substitution was requested.

Substitution Scneario 3—Two In-Game Manual Player Changes with Gap Time

Figure 5B:
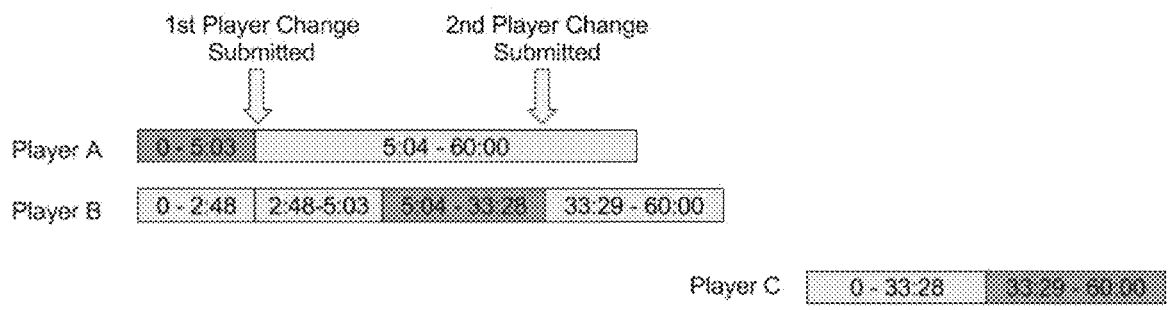

FIGS. 5A and 5B depict a request to change players (i.e., make a player substitution) when the game of the active player, Player A, has played 5:03 of game time and Player B's game has only played 2:48 of game time. This is the same situation as depicted in FIGS. 3A and 3B, except that the contestant requests an additional substitution from Player B to Player C at time 33:28 of Player B's game.

Stats will stop counting for Player B at 33:28, but, since Player C's game has not yet started, the system default is to not count Player C's stats until Player C's game begins and reaches 33:29 of game time. Alternatively, contestant may select to have Player C's stats to begin tallying immediately upon the start of Player C's game, in which case, Player C's stats would tally only until there is 33:29 left on the game clock, at which point a full game's worth of time has been played between the time played by Player A, Player B, and Player C.

Further, if contestant had also opted to begin counting Player B's stats immediately upon contestant's initial substitution request for Player A, the subsequent request to substitute a replacement for Player B at Player B game clock time of 33:28 would mean that a total of 35:43 in game time ([Player A] 5:03+[Player B] 30:40 (33:28−2:48)) had been played.

This would mean, in addition, that upon request of the substitution of Player C for Player B, the system default would be to not tally stats for Player C until Player C's game begins and reaches 35:43 of game time.

Alternatively, if contestant selects to have Player C's stats to begin tallying immediately upon the start of Player C's game, Player C's stats would tally only until there is 35:43 left on the game clock (24:17 played on the game clock), at which point a full game's worth of time has been played between the time played by Player A, Player B, and Player C.

In no instance will the total time played by all three players ever equal more than a full game's worth of game time, unless contestant had opted to start Player C's stats after running the total time played by Player A and Player B (33:28 or 35:43, as described above), and Player C's game goes into overtime, in which case Player C's overtime clock and stats would be counted as well.

By default, overtime stats are counted for a player only if that player is an active player when the game goes into overtime.

As seen in FIG. 5A, a first step 510 enabled by the software and method of the system is the commencement or start of a first game including the Active player on contestant's roster, Player A. A second step 520 enabled by the software and system is the commencement or start of a second game including an inactive player on contestant's roster, Player B.

A third step 530, enables the contestant to request a player substitution or a change in the "Active" player, from Player A to Player B. Additionally, in this example, a fourth step 560 enables the contestant to request another player substitution, from Player B to Player C, in this case at 33:28 on Player B's game clock. Blocks 540 and 545 show that stats accrued for Player A and Player B tally over a period of 33:28 in elapsed game time, at the time the player substitution is requested.

A fifth step 550, enabled by the software and system is the start of a third game including Player C. Blocks 570, 580 and 590 demonstrate the game play time for each player, Player A, Player B and Player C, tallies to a full game's worth of time played.

FIG. 5B depicts a timeline for stats accumulation by Player A and Player B in the example detailed in FIG. 5A. In the example depicted, the player substitution is requested at 5:03 on Player A's game clock, with 54:57 in time remaining. At 5:03 on Player A's game clock, Player B's game clock reads 2:48. Stats begin accruing for Player B on behalf of contestant when Player B's clock reads 5:04, and then contestant makes a second substitution request, to Player C, at 33:28 on Player B's game clock, when Player C's game has not yet started.

Further, at the time the player substitution to Player C is requested in this example, Player C's game has not yet started. Therefore, by default, Active status and stats for Player C may be deferred until Player C's game clock reaches the time on Player B's game clock at which the substitution was requested plus one second (1 s), i.e., 33:29.

Alternatively, if league rules permit and if contestant elects, where Player C's game has not started at the time Player B's status is changed to Out, Player C's status may be changed to Active and stats for Player C may begin to accumulate immediately as soon as Player C's game starts and until 36:32 (i.e., until the game clock has only 33:28 left to play).

However, for strategic purposes, this alternative method of stats accrual for contestant may be less desirable since it would preclude the opportunity to receive the benefit of overtime play, if Player C's game happens to go into overtime, as overtime would occur after a full game's worth of time had been played by all players, Player A, Player B, and Player C, with Player C's status having already been switched to "Out".

Substitution Scenario 4—In-Game Manual Player Change Attempted for Prior Time

FIGS. 6A and 6B depict a request to change players when the game of the active player, Player A, has played 5:03 of game time. When the change is requested, Player B's game has already completed. In this example, as with all options each league commissioner can select how to apply the feature.

If the league chooses to not allow this type of change an error message is displayed and all stats are counted from Player A. However, if the league chooses to allow changes after the fact, Player A would be counted for 5:03 and Player B would be counted for 54:57.

As seen in FIG. 6A, a first step 610 enabled by the software and method of the system is the commencement or start of a first game including the Active player on contestant's roster, Player A. A second step 620 enabled by the software and system is the commencement or start of a second game including an inactive player on contestant's roster, Player B.

A third step 630, enables the contestant to request a player substitution or a change in the "Active" player, from Player A to Player B. Next, the software and system conduct a fourth step 660 to check whether the substitution request change is allowed.

If the answer to this question is no—i.e., the change is not allowed, then the software and system take a fifth step 670 to deliver an error message indicating that the change is not allowed, no player substitution is made, and block 680 depicts the stats accrued by Player A over a full game's worth of time.

But, if the answer to this question is yes—i.e., the change is allowed, then the software and system make the player substitution, replacing Player A with Player B. Blocks 640 and 650 show that stats accrued for Player A and Player B tally over a full game's worth of time.

FIG. 6B depicts a timeline for stats accumulation by Player A and Player B in the example detailed in FIG. 6A. In the example depicted, the player substitution is requested at 5:03 on Player A's game clock, with 54:57 in time remaining. Player B tally's stats for the remaining 54:57 in time.

Substitution Scenario 5—In-Game Manual Player Change with Overtime

FIGS. 7A and 7B depict a request to change players when the game of the active player, Player A, has played 5:03 of game time. When the change is requested, Player B's game has only played 2:48 of game time. So while stats for Player A will stop when the change is submitted, stats for Player B will not begin counting until the game reaches 5:04.

However, in this example, Player B's game goes into overtime, and since Player B is the active player when overtime begins, the overtime stats will be counted as well.

As seen in FIG. 7A, a first step 710 enabled by the software and method of the system is the commencement or start of a first game including the Active player on contestant's roster, Player A. A second step 720 enabled by the software and system is the commencement or start of a second game including an inactive player on contestant's roster, Player B.

A third step 730, enables the contestant to request a player substitution or a change in the "Active" player, from Player A to Player B.

FIG. 7B depicts a timeline for stats accumulation by Player A and Player B in the example detailed in FIG. 7A. In the example depicted, the player substitution is requested at 5:03 on Player A's game clock as shown in block 740, with 54:57 in time remaining. At 5:03 on Player A's game clock, Player B's game clock reads 2:48.

Player B's stats are deferred for 2:15, until Player B's game clock reads 5:04, at which point stats begin to tally for Player B on behalf of contestant for 54:57, as shown in block 750. Since Player B is "Active" status when Player B's game goes into overtime, contestant gets to tally Player B's stats during the overtime period, as shown in block 760.

Substitution Scenario 6—Two In-Game Manual Player Changes with Overtime

FIGS. 8A and 8B depict a request to change players when the game of the active player, Player A, has played 5:03 of game time. When the change is requested, Player B's game has only played 2:48 of game time. So, while stats for Player A will stop when the change is submitted, stats for Player B will not begin counting until the game reaches 5:04. This provides a total of 60:00 of game time. After Player B's game has ended, the user attempts to request a player change to a Player C whose game is in overtime.

Because all settings are customizable within each league, if the league does not allow changes after a game has ended and because Player B's game ended while Player B was the active player and 60 minutes of game time has been counted, no additional changes may be allowed. However, if the contestant had made the change to Player C prior to the end of Player B's game, the change would be allowed and the remaining game time of Player C, including overtime of Player C, would have been counted.

But, if the league allows post game changes, the change would be allowed and the overtime stats of Player C would be counted.

As seen in FIG. 8A, a first step 810 enabled by the software and method of the system is the commencement or start of a first game including the Active player on contestant's roster, Player A. A second step 820 enabled by the software and system is the commencement or start of a second game including an inactive player on contestant's roster, Player B.

A third step 830, enables the contestant to request a player substitution or a change in the "Active" player, from Player A to Player B. In the example depicted, the player substitution is requested at 5:03 on Player A's game clock, with 54:57 in time remaining. At 5:03 on Player A's game clock, Player B's game clock reads 2:48. Player B's stats are deferred for 2:15, until Player B's game clock reads 5:04, at which point stats begin to tally for Player B on behalf of contestant for 54:57, as shown in block 845. Blocks 840 and 845 show that stats accrued for Player A and Player B tally over a full game's worth of time, at the time the second player substitution is requested.

Additionally, in this example, a fourth step 860 enables the contestant to request another player substitution, from Player B to Player C, in this case after Player B's game clock has expired (i.e., Player B's game has ended).

A fifth step 850, enabled by the software and system is the start of a third game including Player C. Next, the software and system conduct a sixth step 865, to check whether the substitution request change is allowed. If the answer to this question is no—i.e., the change is not allowed, then the software and system take a fifth step 855 to deliver an error message indicating that the change is not allowed, no player substitution is made, and blocks 875 and 885 depict the stats accrued by Player A and Player B over a full game's worth of time.

But, if the answer to this question is yes—i.e., the change is allowed even after Player B's game has ended, then the software and system make the player substitution, replacing Player B with Player C, following the end of Player B's game. Blocks 870, 880 and 890 demonstrate the game play time for each player, Player A, Player B and Player C, tallies to a full game's worth of time, plus overtime played by Player C.

FIG. 8B depicts a timeline for stats accumulation by Player A, Player B and Player C in the example detailed in FIG. 8A. In the example depicted, the player substitution is requested at 5:03 on Player A's game clock, with 54:57 in time remaining. At 5:03 on Player A's game clock, Player B's game clock reads 2:48. Stats begin accruing for Player B on behalf of contestant when Player B's clock reads 5:04, and then contestant makes a second substitution request, to Player C, after Player B's game clock has expired, when Player C's game has not yet started.

Further, at the time the player substitution to Player C is requested in this example, Player C's game has not yet started. Therefore, by default, the software and system is configured to query whether such a change is allowed in accordance with league rules.

Substitution Scenario 7—Player Automatically Benched on Max Game Time Trigger

FIGS. 9A and 9B depict a request to bench an active player, without making another player active, for some period of time. From the time Player A is benched until the time the contestant makes Player B active, there are no stats or points accumulating on behalf of the user. In this example, only one player is active at a time; however, alternatively it is possible to have multiple players active for the same position.

This would generate the maximum 60 minutes of game time in only a fraction (e.g., one third) of the game. It is also foreseeable that a league may choose to limit the amount of game time for a position. For example, to allow unlimited player changes, but prevent a contestant from switching between 3 different kickers through a game and generating the equivalent of 3 kickers worth of game statistics, or from constantly switching to a defense that is on the field to generate excess points, a league may choose to limit the amount of time for a position to less than 60 minutes.

As seen in FIG. 9A, a first step 910 includes setting Player A to Active status prior to the start of Player A's game. A second step 920 has Player A benched at 5:03 on Player A's game clock. The block 930 represents Player A's stats tallied over the 5:03 in time elapsed while contestant had Player A in Active status.

A third step 940 has contestant setting Player B to Active status at 32:49 on Player B's game clock. In a fourth step 950, contestant benches Player B at 55:00 on Player B's game clock. Block 960 represents Player B's stats tallied over the 22:11 in time elapsed while contestant had Player B in Active status.

A fifth step 970 includes contestant setting Player C to Active status at the start of Player C's game. In a sixth step 975 Player C is benched by the software and system at 32:46, when the maximum game time threshold 980 is triggered. Block 990 represents Player C's stats tallied over the 32:46 in time elapsed while contestant had Player C in Active status.

FIG. 9B depicts a timeline for stats accumulation by Player A, Player B and Player C in the example detailed in FIG. 9A.

In this style of game play, the user is putting players in and out throughout the game time just as a coach on the sideline would do, and managing their actual playing time.

Pass Interference Scoring Scenario

FIG. 10 depicts an embodiment that utilizes data on penalties for pass interference that are contained within the statistics provided by various stat providers. This data contains not only the player who the penalty is called upon, but also the passer and receiver who were impacted. If the league commissioner chooses to enable this feature, the data will be captured and added to the statistics for both the Quarterback and Receiver who were impacted. Once the passing and receiving yards are captured, scoring for these yards can be applied based on each league's scoring settings.

The software and system provide yardage and reception points to quarterbacks and receivers when there is a pass interference penalty. This is a spot foul in the NFL and the actual team is getting benefit for the penalty, so the players affected in fantasy could be awarded the yardage as well.

In FIG. 10, the stats provider 1010 sends the data to the data store 1020, a non-transitory computer readable media. The Pass interference data 1040 is pulled from the data store 1020. Pass interference settings 1030 are used to filter the pass interference data 1040, into passing player statistics 1050 and receiving player statistics 1060.

Separate stat lines will be created for Pass Interference Passing Yards, Pass Interference Completions, and Pass Interference Receiving Yards, and Pass Interference Receptions. This will allow each commissioner to determine if they want to use this feature and also assign different points for this category than they would for a regular catch and reception.

Users will be able to see these stats for each player as well. As with all settings in the software and system of the present invention, each league commissioner can choose which rules to use in their league.

Points for Pass Interference involves taking the penalty information that is obtained in real time, identifying the Passer and Receiver involved, identifying the yards awarded in the penalty, and applying points to each player based on the yards awarded. So, if the QB throws a 20-yard pass to his WR and Pass Interference is called, we are able to give both the QB and WR points for the 20-yard pass.

It could be that the WR was the passer and the TE was the Receiver, it would still work the same way with the WR getting the Passer Points and the TE getting the receiver points. There is no benefit to the defender in the play. Pass Interference is a unique penalty in that they treat it as if the pass was completed. The only exception being a pass to the endzone would move the ball to the 1-yard line, not the endzone.

Since the NFL really treats it as a completed pass, we do as well. The actual points awarded would vary based on the league's settings. In most standard leagues, a WR gets 1 point for every 10 yards. So, in the example above the receiver (the WR in one example and the TE in the other) would get 2 points.

If it is a league that also gives points for the catch (Points Per Reception or PPR) then he would also get 1 point for the catch for a total of 3 points. A QB normally gets 1 point for every 25 yards of passing. So, the Passer (the QB in one example and the WR in the second example) would get 0.8 points for the pass.

Salary and Caps Team Management Scenario

The present invention enables the integration of actual salaries and a salary cap based on the actual Leagues salary cap rules, including dead cap. The system will maintain all players' salary data and League salary cap information. It will suggest a cap based on comparing the roster size to an actual team roster.

It then bases the cap on the percent (%) of cap used and overall average salaries for top players. For example, in a league with 20 players per team, the system will look at the sum of the top 20 salaries for each NFL team and take the average amount. It will then look at the percent of cap space used for each team and take the average. So, with an NFL cap of $153 M if the average top 20 salaries for each team is $100 M and the average cap usage across the NFL is 90%, the suggested cap would be $111 M (100/0.9=111).

If the league chooses a standard draft the player value will match their salary, however, in an auction draft, a player will have a recommended minimum salary of 90% of their actual salary, however, this percentage can be modified by each league's commissioner. People will then be able to bid for the player with increasing salaries.

By keeping track of player contract terms, the present invention will also integrate Dead Cap which is the amount of guaranteed money a team is responsible for after a trade. So, if a player is guaranteed $2 M in the current year and $2 M in the following year, if the player is traded the team would still have $2 M count towards this year's cap and $2 M count towards next year's cap.

The present invention is also configured to enable dynasty league Dead Cap. So, in a dynasty league that is using salary caps, the $2 M that would count towards next years' salary cap will be tracked in the system and counted against that team in the following year even though the player is no longer on their roster.

The present invention also takes into account guaranteed contracts, where the team is on the hook for a player's full salary amount, regardless of whether the player is actually able to play or not. For motor sports, every contestant can get any racer, but for league play of team sports only one contestant can have any given player at one time.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations.

For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

As shown in FIG. 11, the above embodiments for a fantasy league system can be implemented on a computer system that is accessible via a website over the Internet. The fantasy league website can be stored on a server 1100, which may include one or more processors and memory devices. Data obtained from contestants, such as identifying information, true team, and fantasy roster information may be stored on a database 1102 that is in communication with the server 1100.

Information concerning the league, including player information, team information, division information, point totals, contestant transactions made during the fantasy league, website information, and the like, may be stored on the database 1102 or any memory associated with the server 1100. Any non-transitory computer readable medium may be used and associated with the server to store information concerning a plurality of fantasy players from base teams of a base league, and all related information concerning the fantasy player and their performance.

A back-end computer 1104 may also be in communication with the server 1100 to access and edit information stored on the server and/or database. The server or the back-end computer may be used to edit the pages of the website, such as updating professional team rosters, setting fantasy league rules, setting point values and true points, setting available prizes, and the like. Furthermore, the server 1100 or the back-end computer 1104 may analyze and send reminder to contestants based on contestant rosters.

For instance, the server or back-end computer 1104 may send a notification to a contestant that his roster needs to be revised for a certain week or game because a selected player is playing against the contestant's true team. Notification may also be sent out if the contestant's roster needs to be revised because a currently selected player has a bye week or is otherwise into playing in the upcoming game. Other notifications, such as automatic changes made to a roster by the server 1100 or back-end computer 1104, may also be sent to contestants.

Notifications may be sent out via the server or back-end computer in the form of an email to a contestant's email address that is stored on the database 1102 and associated with the contestant. In other embodiments, the notifications sent out by the server or back-end computer may be a text message to the contestant's cell number or even a prerecorded (or live) phone call to the contestant's phone number stored in the database.

Having a system that sends notifications to contestants as a reminder to adjust roster on a fantasy team helps to solve the problem of contestants forgetting to set a lineup for the week or upcoming game, or forgetting to check which players are available for the upcoming game(s). The system may send out a reminder to all contestants at a certain time to remind contestants to review or modify their player rosters.

The server 1100 may also post notification directly to the fantasy web site or a social media site. These notifications may be available to other contestants in the league or made private so only the contestant can view notifications form the server. The notification feature of the current system helps solve the problem of existing fantasy leagues that only post notifications on the fantasy website. Using the embodiments disclosed herein, users can receive notifications without logging onto the fantasy web site in order to help contestants field a full team every game.

The server 1100 also may be used to calculate the standings every day or week based on total points for all leagues, divisions, and teams. The server may perform other functions for the system, including managing the fantasy league, managing the leader board or standings, and determining prizes or awards to participating members of the league. The server may manage the league by automatically limiting the use of any fantasy player playing against the selected favorite team from the base league during the fantasy sports league.

In other embodiments, each league or division of the league may have a manager that may log onto the server 1100 through the Internet to manage and run the fantasy league by setting rules, point values, monitoring trades, and communicating to other contestants in the league.

As shown in FIG. 11, the server is connected to the Internet 1106. In this way, contestant computers 1108 can access the web site on the server. Mobile or remote devices 1110, such as cell phones, smart phones, tablets, and other computer devices, can access and receive information from the server 1100 through the Internet as well.

Contestants may be able to receive notifications directly from the server 1100 or back-end computer 1102 on their mobile device (text, email, voice call) or information may be received through the contestant's computer 1108. Contestants that log into the server 1100 may then run their team and communicate with other contestants or administrators.

It should be understood that a plurality of mobile or remote devices may be connected to the server over the Internet 1106 or any other network. In use the plurality of remote devices will have graphical user interface on the display screen to select a fantasy team of fantasy players, and make roster moves, if available.

All selections and information provided from the remote devices made through the interface may be stored in the database or other non-transitory computer readable medium associated with the server. Accordingly, what has been described is a method and system for a fantasy sports league or contest.

It should be understood that, although specific embodiments have just been described, the claimed subject matter is not intended to be limited in scope to any particular embodiment or implementation. For instance, many of the embodiments described were in reference to or in conjunction with bat-and-ball games. However, it should be understood that many of these features, elements and limitations may also be applied to many of the other sports intended to be covered by and included in the present invention, such as motorsports, hockey, soccer, baseball and basketball.

In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill in the art were omitted or simplified so as not to obscure claimed subject matter.

While certain features have been illustrated or described herein, many modifications, substitutions, or equivalents may not occur to those skilled in the art. It is, therefore, to be understood that the appended claims are intended to cover all such modifications or changes as fall within the true spirit of the claimed subject matter. Thus, it will be apparent from the foregoing that, while particular forms of the invention have been illustrated and described, various modifications can be made without parting from the spirit and scope of the invention.

What is claimed is:

1. A non-transitory computer-readable medium comprising computer software for using a fantasy sports contest application to provide to a contestant the ability to substitute bench players for active players while a corresponding live sports game is in progress, where the computer software is executed on a plurality of computers, including a user interface, in conjunction with memory, bus elements and network, the computer software comprising:
   code establishing a player performance stats tracker configured to track stats from each player's game;
   code providing a game clock reader configured to read a game clock from each player's game;
   code establishing a database housed on one or more non-transitory computer readable media, wherein the database is configured to store game clock times and player stats, including player active and inactive statuses;
   code enabling substitution of a bench player for an active player at a time during a live game based on outcomes of one or more player performance threshold triggers using real-time in-game player stats and real-time in-game player stats predictions;
   code tallying points obtained based on the performance stats of each active player; and
   code providing a real-time updates of player stats predictions.

2. The medium of claim 1 additionally comprising code enabling substitution of a bench player for an active player, wherein the threshold trigger acts on one or more player performance parameters, including yards rushing, yards receiving, passes completed, receptions caught, passes blocked, sacks made, and ratio of time played on the field to total elapsed game time.

3. The medium of claim 1 additionally comprising code performing substitution of a bench player for an active player based on a change in status of a starting player from active to out, based on one or more of injury and suspension.

4. The medium of claim 2, additionally comprising code performing substitution of a bench player for an active player using the player performance threshold trigger, further comprising the following formula: real-time in-game player stats predicted for an active player, Player A, are less than player stats predicted for a bench player, Player B, in a contemporaneous or future game.

5. The medium of claim 1 additionally comprising code providing a position place holder if the user moves a player from active status to bench or out status without substituting a bench player for an active player's position.

6. The medium of claim 1 wherein the fantasy sports contest comprises any sport with a plurality of players.

7. A system for a fantasy sports league, comprising:
   a database storing a plurality of fantasy players;
   a plurality of user interface devices connected to the database over a network, wherein the user interface is configured to enable a contestant to select a fantasy team of fantasy players and wherein the selections made through the interface on the user interface devices are stored in the database; and
   one or more servers comprising a cloud-based stats provider;
   a player performance stats tracker configured to track stats from each player's game;
   a game clock reader configured to read a game clock from each player's game;
   a database housed on one or more non-transitory computer readable media, wherein the database is configured to store game clock times and player stats, including player active and inactive statuses;
   a substitution mechanism enabling substitution of a bench player for an active player at a time during a live game based on outcomes of one or more player performance threshold triggers using real-time in-game player stats and real-time in-game player stats predictions;
   a fantasy points tallying mechanism enabling accrual of points obtained based on the performance stats of each active player; and
   a player stats projection real-time update mechanism providing real-time updates of player stats projections.

8. The system of claim 7, wherein the substitution mechanism further enabling substitution of a bench player for an active player, wherein the threshold trigger acts on one or more player performance parameters, including yards rushing, yards receiving, passes completed, receptions caught, passes blocked, sacks made, and ratio of time played on the field to total elapsed game time.

9. The system of claim 7, wherein the substitution mechanism further performs substitution of a bench player for an active player based on a change in status of a starting player from active to out, based on one or more of injury and suspension.

10. The system of claim 7, wherein the substitution mechanism further performs substitution of a bench player for an active player using the player performance threshold trigger, further comprising the following formula: real-time in-game player stats predicted for an active player, Player A, are less than player stats predicted for a bench player, Player B, in a contemporaneous or future game.

11. The system of claim 7, wherein at least one of the plurality of user interface devices is a mobile phone.

12. The system of claim 11, wherein the fantasy league server sends notifications to the mobile phone via one or more of a text message and a voice message.

13. A method for a fantasy sports league, comprising:
   providing a plurality of fantasy players on a database;
   connecting a plurality of remote user interface devices to the database over a network;
   receiving input from one of the plurality of user interface devices using an interface to select a fantasy team of fantasy players;
   storing the selections made through the interface on the user interface devices on the database, comprising one or more non-transitory computer readable media;
   providing player performance stats from each player's game to a player performance stats tracker;
   providing a game clock time from each player's game to a player game clock tracker;
   storing game clock times and player stats, including player active and inactive statuses on the database;
   tallying fantasy game points obtained based on the performance stats of each active player;
   providing player stat projection updates in real-time;
   substituting a bench player for an active player during a live game based on outcomes of one or more player performance threshold triggers using real-time in-game player stats and real-time in-game player stats predictions; and notifying, via the fantasy league server, any of the plurality of user interface devices that a change to the selected fantasy players has been made.

14. The method of claim 13, wherein at least one of the plurality of user interface devices is a mobile phone.

15. The method of claim 14, wherein notifying the mobile phone of one contestant through one or more of a text message and a voice message.

16. The method of claim 13, wherein substituting a bench player for an active player is performed using the threshold trigger acting on one or more player performance parameters, including yards rushing, yards receiving, passes completed, receptions caught, passes blocked, sacks made, and ratio of time played on the field to total elapsed game time.

17. The method of claim 13, wherein substituting a bench player for an active player is performed using a change in status of a starting player from active to out, based on one or more of injury and suspension.

18. The method of claim 13, wherein substituting a bench player for an active player is performed using the player performance threshold trigger, further comprising the following formula: real-time in-game player stats predicted for an active player, Player A, are less than player stats predicted for a bench player, Player B, in a contemporaneous or future game.

19. The method of claim 13, wherein at least one of the plurality of user interface devices is a mobile phone.

20. The method of claim 19, wherein the fantasy league server sends notifications to the mobile phone via one or more of a text message and a voice message.

* * * * *